(12) United States Patent
Hoffman et al.

(10) Patent No.: US 8,970,166 B2
(45) Date of Patent: Mar. 3, 2015

(54) INDUCTIVE BATTERY SYSTEMS AND METHODS OF OPERATION

(75) Inventors: Peter F. Hoffman, Avon, OH (US); Stephen E. Osmialowski, Elyria, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 558 days.

(21) Appl. No.: 13/139,324

(22) PCT Filed: Dec. 10, 2009

(86) PCT No.: PCT/US2009/067442
§ 371 (c)(1),
(2), (4) Date: Jun. 13, 2011

(87) PCT Pub. No.: WO2010/077759
PCT Pub. Date: Jul. 8, 2010

(65) Prior Publication Data
US 2011/0241617 A1    Oct. 6, 2011

Related U.S. Application Data

(60) Provisional application No. 61/122,821, filed on Dec. 16, 2008.

(51) Int. Cl.
*H02J 7/00*    (2006.01)
*H02J 7/16*    (2006.01)
(Continued)

(52) U.S. Cl.
CPC ............. *H01M 10/46* (2013.01); *H01M 10/42* (2013.01); *H02J 7/025* (2013.01); *H02J 7/02* (2013.01); *H01M 10/4257* (2013.01); *H01F 38/14* (2013.01)
USPC ........... 320/108; 320/112; 320/132; 320/107; 320/127; 429/100; 429/96; 429/92

(58) Field of Classification Search
USPC ........... 320/108; 429/129, 130; 420/130, 100, 420/96, 9, 10, 97, 98, 99, 121, 122, 165, 420/170
See application file for complete search history.

(56) References Cited

U.S. PATENT DOCUMENTS 3,885,211 A    5/1975    Gutai
4,031,449 A *  6/1977    Trombly ...................... 320/108
(Continued)

FOREIGN PATENT DOCUMENTS

JP    09-182304 A     7/1997
KR    10-2004-0101177 A    12/2004
KR    10-0564255 B1    3/2006

OTHER PUBLICATIONS

Patent Cooperation Treaty (PCT), International Search Report and Written Opinion for Application No. PCT/US2009/067442, filed Dec. 10, 2009, mailed Jul. 8, 2010, Korean Intellectual Property Office, Republic of Korea.

*Primary Examiner* — Edward Tso
*Assistant Examiner* — Alexis A Boateng
(74) *Attorney, Agent, or Firm* — Eveready Battery Company, Inc.

(57) ABSTRACT

An inductive battery system includes a primary coil system (102) and an inductive battery (122). The primary coil system (102) provides inductive power (106). The inductive battery (122) includes a secondary coil system (108), charge circuitry (110), output circuitry (112), and an internal battery (114). The secondary coil system (108) receives the inductive power (106) and provides electrical power. The charge circuitry (110) receives the electrical power and supplies suitable power to the internal battery (114) for charging and/or device operation. The output circuitry (112) receives electrical energy from the internal battery (114) and provides the electrical energy external to the system (100) as external power (124). The internal battery (114) stores the received electrical power from the charge circuitry (110) and supplies the electrical power to the output circuitry (112).

19 Claims, 6 Drawing Sheets

(51) Int. Cl.
  *H01M 10/46* (2006.01)
  *H01M 10/42* (2006.01)
  *H02J 7/02* (2006.01)
  *H01F 38/14* (2006.01)

(56) References Cited

U.S. PATENT DOCUMENTS

| | | | |
|---|---|---|---|
| 4,408,151 A * | 10/1983 | Justice | 320/107 |
| 4,611,161 A * | 9/1986 | Barker | 320/112 |
| 5,277,993 A * | 1/1994 | Landers | 429/10 |
| 5,959,433 A * | 9/1999 | Rohde | 320/108 |
| 6,067,474 A | 5/2000 | Schulman et al. | |
| 6,208,115 B1 * | 3/2001 | Binder | 320/108 |
| 6,308,115 B1 | 10/2001 | Yamaguchi et al. | |
| 6,498,455 B2 | 12/2002 | Zink et al. | |
| 7,211,986 B1 | 5/2007 | Flowerdew et al. | |
| 8,460,816 B2 * | 6/2013 | Julstrom et al. | 429/121 |
| 2002/0001745 A1 * | 1/2002 | Gartstein et al. | 429/61 |
| 2005/0116683 A1 * | 6/2005 | Cheng et al. | 320/108 |

\* cited by examiner

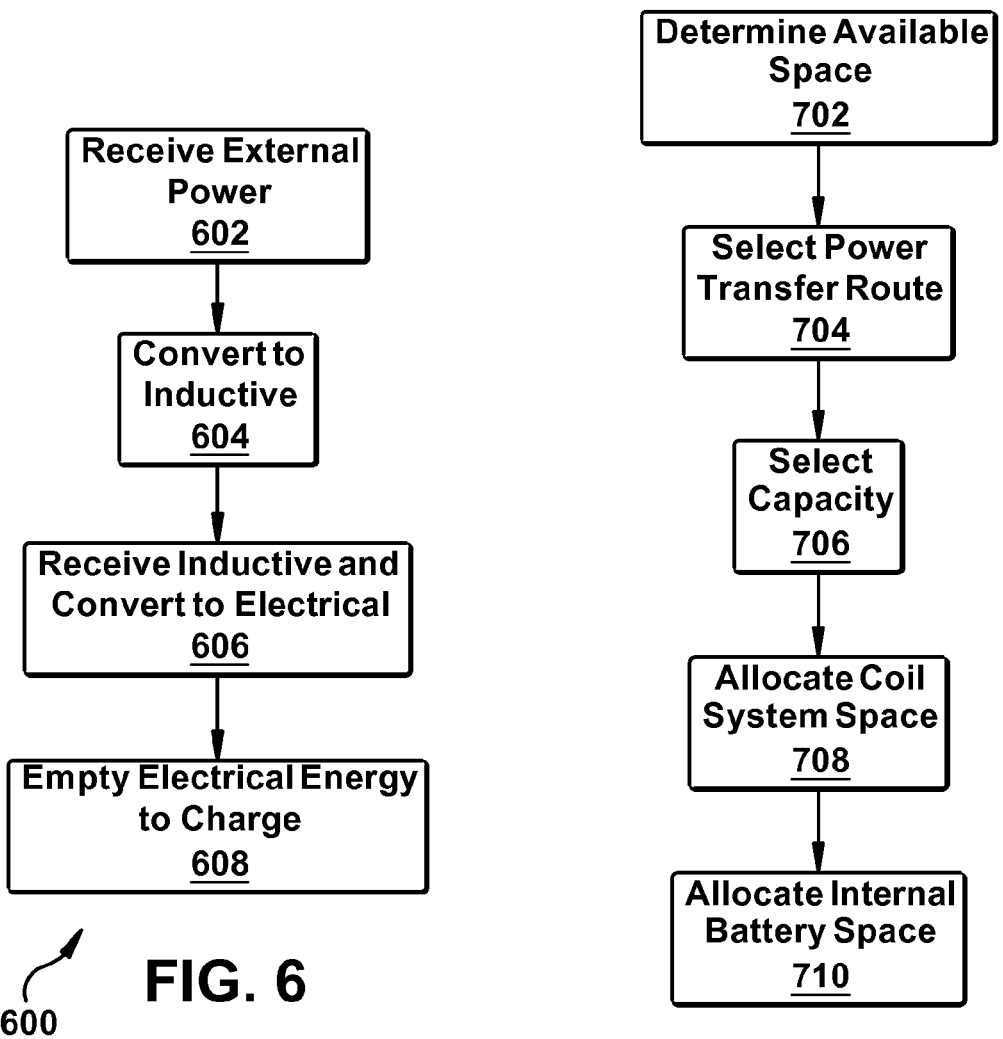

INDUCTIVE BATTERY SYSTEMS AND METHODS OF OPERATION

FIELD OF THE INVENTION

The present invention generally relates to inductive battery systems and methods of operation.

BACKGROUND OF THE INVENTION

Batteries are widely used in portable devices, such as flashlights, digital audio players, and the like. Batteries power these devices and dissipate power over time. As a result, the batteries require replacement after substantially discharging in order to operate the devices.

Primary type batteries are disposed of after one use and then need replacement. Secondary type batteries, also referred to as rechargeable batteries also discharge, but can be placed in a charger for recharging and re-use. However, rechargeable batteries typically require contact mechanisms to enable charging. The repeated charging can degrade the contact mechanisms and degrade performance of the batteries.

SUMMARY OF THE INVENTION

In an embodiment of the invention, there is an inductive battery system. The inductive battery system includes a primary coil system 102 and an inductive battery 122. The primary coil system 102 provides inductive power 106. The inductive battery 122 includes a secondary coil system 108, charge circuitry 110, output circuitry 112, and an internal battery 114. The secondary coil system 108 receives the inductive power 106 and provides electrical power. The charge circuitry 110 receives the electrical power and supplies suitable power to the internal battery 114 for charging and/or device operation. The output circuitry 112 receives electrical energy from the internal battery 114 and provides the electrical energy external to the system 100 as external power 124. The internal battery 114 stores the received electrical power from the charge circuitry 110 and supplies the electrical power to the output circuitry 112.

In another embodiment of the invention, there is provided a method of operating an inductive battery system.

BRIEF DESCRIPTION OF THE DRAWINGS

These and other features of inductive battery systems will be more readily understood from the following detailed description of the various aspects of the embodiments taken in conjunction with the accompanying drawings in which:

FIG. 6 is a method 600 according to an embodiment of the invention.

FIG. 7 is a method 700 according to an embodiment of the invention.

Figure 1:
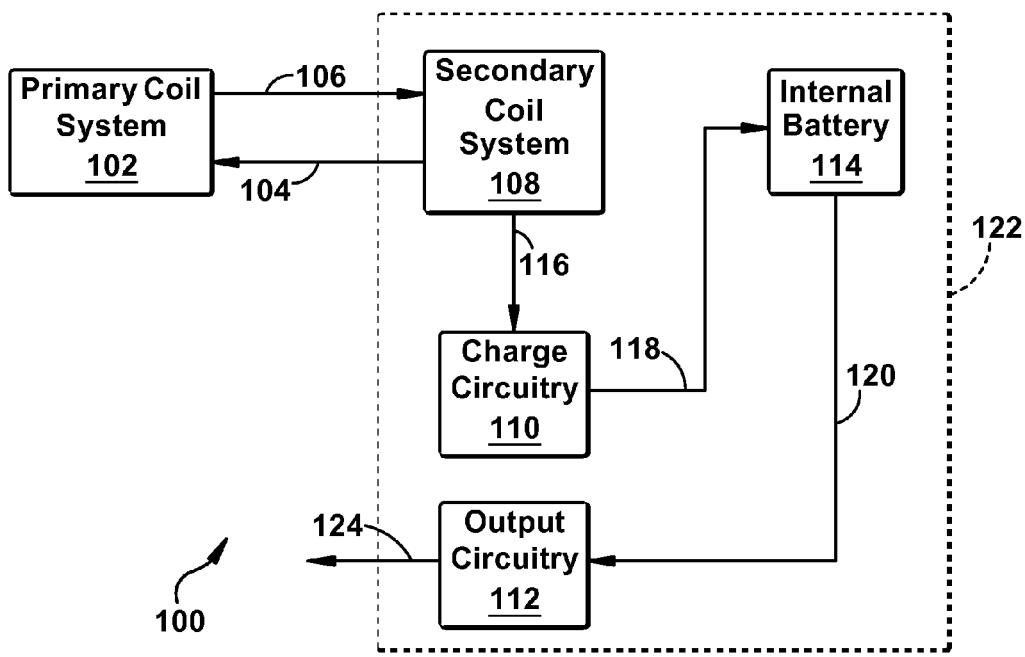
FIG. 1 is a block diagram of an inductive battery system according to an embodiment of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 shows a block diagram of an inductive battery system 100 in according to an embodiment of the invention. The system 100 is operable to wirelessly charge an inductive battery 122 without requiring external or physical contacts to transfer power. The battery 122 can be charged while in a device, such as a flashlight, or external to a device.

The system 100 includes a primary coil system 102 and the inductive battery 122. The primary coil system 102 provides an inductive field/power 106, also referred to as a magnetic field, that is then received by the inductive battery 122. The primary coil system 102 can be connected to external primary power source, some examples of which include mains power, battery power, solar power, and the like. A primary power source can be considered as a relatively large and persistent source of energy, such as the AC mains or large storage battery. Additionally, a primary source can be considered as the first part of the system or the original source such as a solar, wind or other alternative energy system that will be converted to some secondary form. The primary coil system 102, in some examples, may receive information from the battery 122 to facilitate the transfer of power and power efficiency as indicted by 104.

The primary coil system 102 is comprised of suitable components that permit generation of the inductive field 106. In one example, the primary coil system 102 comprises an oscillator that drives a pair of transistors in antiphase by the use of a phase inverter and a series resonant tuned circuit comprising an inductor and a capacitor. The coil system 102 generates the field to have a selected frequency, field shape, and field magnitude. In one example, the frequency is set to a 2 Mhz to permit smaller coils and fewer turns.

The inductor may comprise a small number of circular turns of sufficient diameter, for example, to cover an area of about 18 to 20 square inches.

The inductive battery 122 includes a secondary coil system 108, charge circuitry 110, output circuitry 112, and an internal battery 114. The inductive battery 122 has a shape or form factor that may facilitate its use in devices. Some examples of suitable form factors include battery sizes include "AA", "AAA", "C", "D", "9-Volt", or lantern sized batteries.

The secondary coil system 108 receives the power 106 from the primary coil system 102. The secondary coil system 108 includes circuitry and coil(s) that facilitate the receiving of the power 106 and convert that power 106 into electrical power 116, which is then provided at a current and voltage.

The charge circuitry 110 receives the electrical power 116 and provides charging power 118 to the internal battery 114. The charge circuitry 110 includes components that controllably transform the electrical power 116 into the charging power 118. In one example, the charging power 118 is a constant current. In another example, the charging power 118 is provided as a constant current until a voltage of the internal battery 114 reaches a first value and then the charging power 118 is provided as a constant voltage until the internal battery 114 is fully charged.

The internal battery 114 receives the charging power 118 for charging and provides an output power 120. The internal battery 114 may also provide fuel gauging, temperature, internal voltage measurements, and the like to facilitate the charging process. The internal battery 114 includes cells or storage elements of a suitable chemistry, for example, NiMH, lithium ion, capacitors, electrochemical capacitors and the like. The output power 120 is provided on demand.

The output circuitry 112 receives the output power 120 and provides external power 124. The output circuitry 112 may modify the characteristics of the external power 124 to selected or determined voltage and current values from the received output power 120.

The physical sizes of the secondary coil system 108 and the internal battery 114 can be selected to yield desired battery operation characteristics. A larger internal battery of a same chemistry permits greater electrochemical storage of energy. A larger secondary coil system 108 generally permits power to be transferred at a greater rate. Thus, a relatively high rate of charging can be obtained with a larger secondary coil system 108 and a relatively smaller internal battery 114. Thus, design of particular systems 100 can vary with ratios or percentages of total available space allocated to the secondary coil system 108 and the internal battery 114. For example, one system may allocate 25% to the secondary coil system 108 and 75% to the internal battery 114 and another system may allocate 60% to the secondary coil system 108 and 35% to the internal battery 114.

Figure 2:
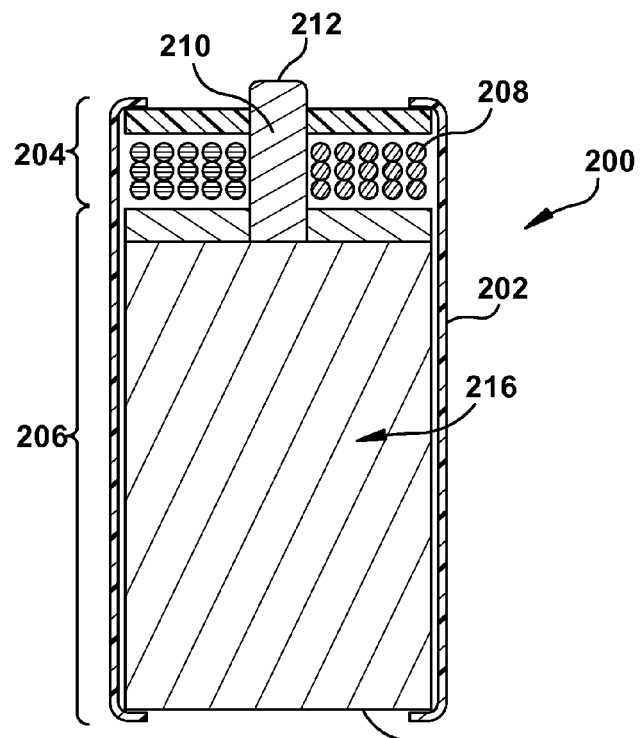
FIG. 2 is a diagram of an inductive battery 200 according to an embodiment of the invention.

FIG. 2 is a diagram of an inductive battery 200 in accordance with an embodiment of the invention. The battery 200 can receive power via inductive power and/or positive and negative contacts. The battery 200, for example, can be employed as the battery 122 in the system 100 of FIG. 1.

The battery 200 includes an outer casing 202 that provides a structure or housing for the battery. The casing 202 can comprise multiple layers and include material that facilitates shaping of inductive fields and mitigating unwanted interference. The battery 200 includes a coil cavity 204 and a battery cavity 206. The coil cavity 204 houses a secondary coil system 208. The secondary coil system 208 includes a secondary coil that is exposed to the inductive/magnetic field generated by the primary coil system 102. An example of a suitable field is a changing magnetic field driven by an alternating current in the primary coil of the primary coil system 102. The frequency of this field need not be fixed but is generally in the 75 kHz to 150 kHz range, although other higher frequencies of 500 kHz, 1 MHz or more are contemplated. Lower frequency fields can also be used but will require larger coil sizes to achieve similar power transfer. This inductive/magnetic field induces a current flow in the secondary coil that is subsequently harvested and converted into electrical energy that can then be stored electrochemically in the secondary battery. The system 208, in this example, includes a secondary coil as a bobbin positioned proximate to the battery cavity 206. The secondary coil system 208 is operable to convert received inductive/magnetic power into electrical power with selected or dynamically determined characteristics including, but not limited to, current, voltages, and the like.

The secondary coil system 208 also generally includes a rectification circuit that rectifies the received electrical power, for example, to facilitate charging.

The battery 200 also includes a conductive rod 210 positioned at a positive end of the casing 202. The conductive rod 210 is comprised of a suitable material, such as ferrite. Use of a material such as ferrite facilitates the shape of received inductive field so as to enhance efficiency by directing the field to cross the secondary coil in a manner that maximizes the inductive coupling and therefore the efficiency of the power transfer. Additionally, the conductive rod 210 operates as a positive contact 212 and provides an electrical connection to the battery cavity 206. The conductive rod 210 serves several purposes. A first purpose is to provide an electrical path from the positive end of the internal battery cell to the positive contact on the finished battery that the user will contact. A second purpose is to provide a favorable path for the magnetic field to enter and couple with the secondary coil.

As an example, these two features are accomplished by means of a multi-material rod shown in FIGS. 8-11. The rod comprising a ferrite material 806 and an inner core 802 that is comprised of an electrically conductive material 802, such as nickel plated steel. An insulator 804 is also placed between the ferrite material and the conductive material to serve as an electrical barrier.

Returning to FIG. 2, a negative contact 214 is provided at a negative end of the casing 202. The negative contact 214, in one example, is a conductive portion of the casing 202. The positive contact 212 and the negative contact 214 provide electrical power and can, in some examples, receive electrical power.

The battery cavity 206 includes a battery 216 of a suitable chemistry, such as, NiMh, lithium ion, lead acid, and the like. Alternately, the battery can be a capacitor.

For charging operation, a circuit (not shown) within the casing 202 provides electrical energy to the battery 216 to recharge the battery 216. The circuit can receive electrical power via the positive and negative contacts 212, 214 and/or the secondary coil system 208. The circuit may regulate the voltage and/or current of the electrical energy to facilitate charging.

For discharging operation, a circuit (not shown) within the casing 202 provides electrical energy from the battery 216 to the positive and negative contacts 212, 214 and/or the secondary coil system 208. It is noted that providing power to the secondary coil system 208 provides generation of inductive power via the coils that may then be received by another secondary coil system.

Figure 3:
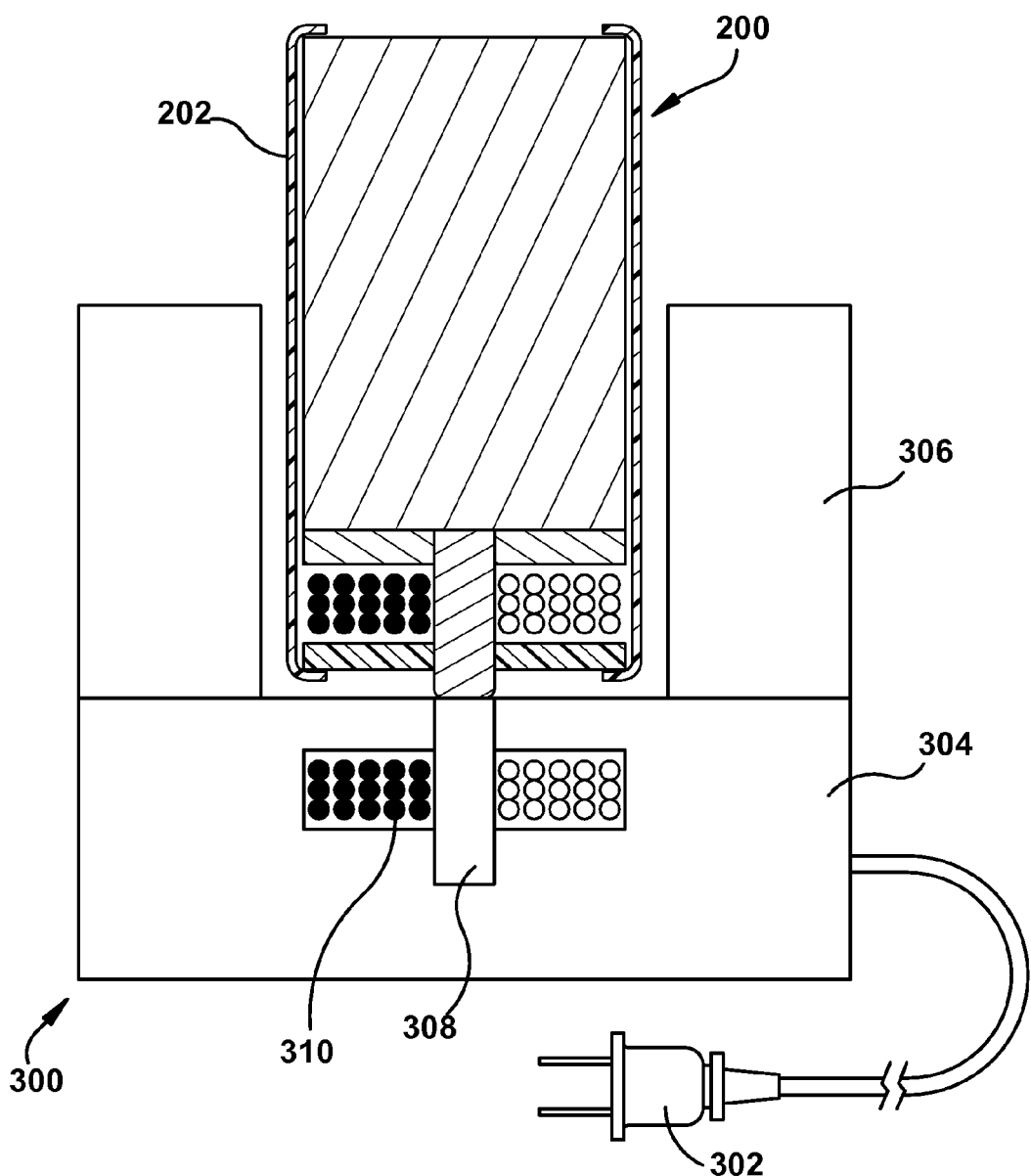
FIG. 3 is a diagram of an inductive system 300 according to an embodiment of the invention.

FIG. 3 is a diagram illustrating an inductive battery system 300 in accordance with an embodiment of the invention. The system 300 is shown with a base or pad component 304 that is operable to transfer energy to inductive enabled batteries, such as the battery 200 in order to charge and/or supply power. The system 300 is shown in this example with the inductive battery 200, however other inductive batteries and/or inductive devices operable to receive inductive power can also be configured to receive the transferred or supplied energy.

The system 300 includes a base or pad component 304 that includes a primary coil system 310 and a conductive rod 308. The primary coil system 310 is connected to a power supply 302 or other suitable power source to receive power. The primary coil system 310 generates an inductive/magnetic field from the received power. In one example, the generated field is according to preconfigured characteristics and includes frequency and amplitude that is harvested by the secondary coil and employed by the battery 200 to recharge itself. The system 300 optionally includes side components 306 that can stabilize and/or align the battery 200. In one example, the side components 306 are removable.

The base component 304 optionally includes a visual or audio interface (not shown) for providing information as to the status or operation of the base component 304. For example, the interface could emit a sound when power is being transferred or display a green indicator light.

Figure 4:
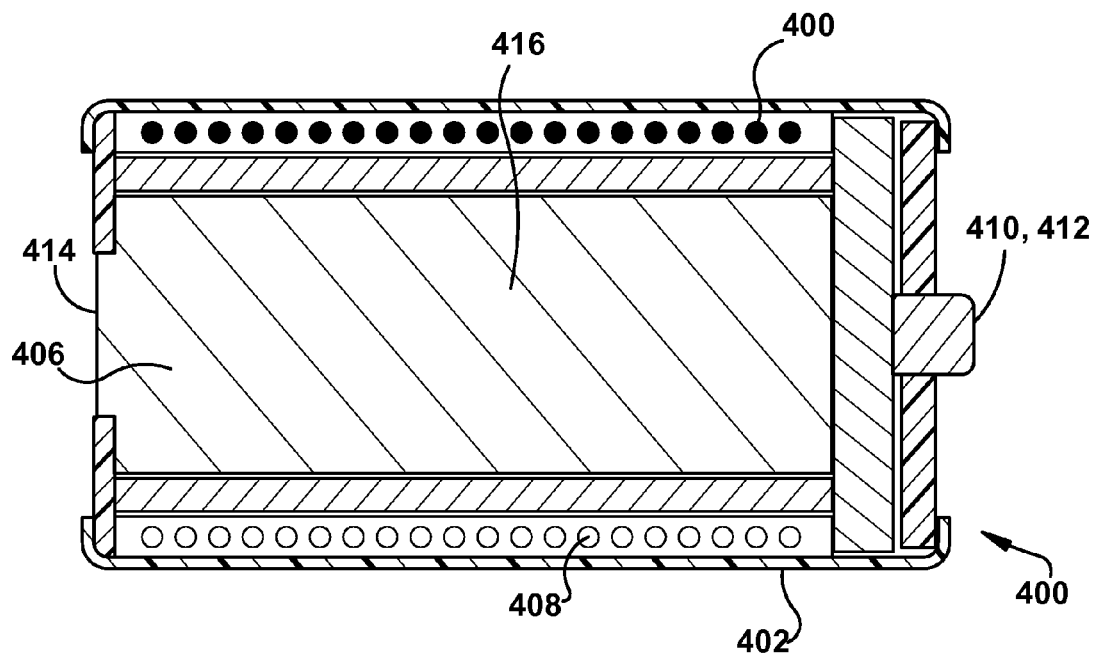
FIG. 4 is a diagram of another inductive battery 400 according to an embodiment of the invention.

FIG. 4 is a diagram of another inductive battery 400 in accordance with an embodiment of the invention. The battery 400 can receive power via inductive power and/or positive and negative contacts. The battery 400, for example, can be employed as the battery 122 in the system 100 of FIG. 1.

The battery 400 includes an outer casing 402 that provides a structure or housing for the battery. The casing 402 can comprise multiple layers and include material that facilitates shaping of inductive fields and mitigating unwanted interference. The battery 400 includes a coil cavity 404 and a battery cavity 406. The coil cavity 404 houses a secondary coil system 408. The system 408 includes one or more coils positioned within the battery cavity 406 proximate to the casing 402 as shown in FIG. 4. The secondary coil system 408 is operable to convert received inductive power into electrical power with selected or dynamically determined characteristics including, but not limited to, current, voltages, and the like.

The secondary coil system 408 also generally includes a rectification circuit that rectifies the received electrical power, for example, to facilitate charging.

In one example, the secondary coil system 408 comprises a secondary coil formed by winding a wire or other suitable conductive material about the casing 402.

In another example, the secondary coil system 408 comprises a secondary coil formed in a label attached to the casing 402. For example, the coil could be formed in the label by forming an insulating layer as a base layer, which can also serve as an outer sheath. Then, a pattern of a conductive material is formed or deposited over the insulating layer. The conductive material includes, for example, conductive ink, foil, copper, aluminum, alloys, and the like. The pattern forms coils about the casing 402. A second insulating layer can be formed over the pattern of conductive material. Additionally, the second insulating layer can include one or more apertures for providing electrical contact to the pattern of the conductive material.

The battery 400 also includes a conductive rod 410 positioned at a positive end of the casing 402. The conductive rod 410 is comprised of a suitable material, such as ferrite. Use of a material such as ferrite facilitates the shape of received inductive field/power so as to enhance efficiency. Additionally, the conductive rod 410 operates as a positive contact 412 and provides an electrical connection to the battery cavity 406.

A negative contact 414 is provided at a negative end of the casing 402. The negative contact 414, in one example, is a conductive portion of the casing 402. The positive contact 412 and the negative contact 414 provide electrical power and can, in some examples, receive electrical power.

The battery cavity 406 includes a battery 416 of a suitable chemistry, such as, NiMH, lithium ion, lead acid, and the like. Alternately, the battery can be a capacitor or electrochemical capacitor.

For charging operation, a circuit (not shown) within the casing 402 provides electrical energy to the battery 416 to recharge the battery 416. The circuit can receive electrical power via the positive and negative contacts 412, 414 and/or the secondary coil system 408. The circuit may regulate the voltage and/or current of the electrical energy to facilitate charging.

For discharging operation, a circuit (not shown) within the casing 402 provides electrical energy from the battery 416 to the positive and negative contacts 412, 414 and/or the secondary coil system 408. It is noted that providing power to the secondary coil system 408 provides generation of inductive power via the coils that may then be received by another secondary coil system.

Figure 5:
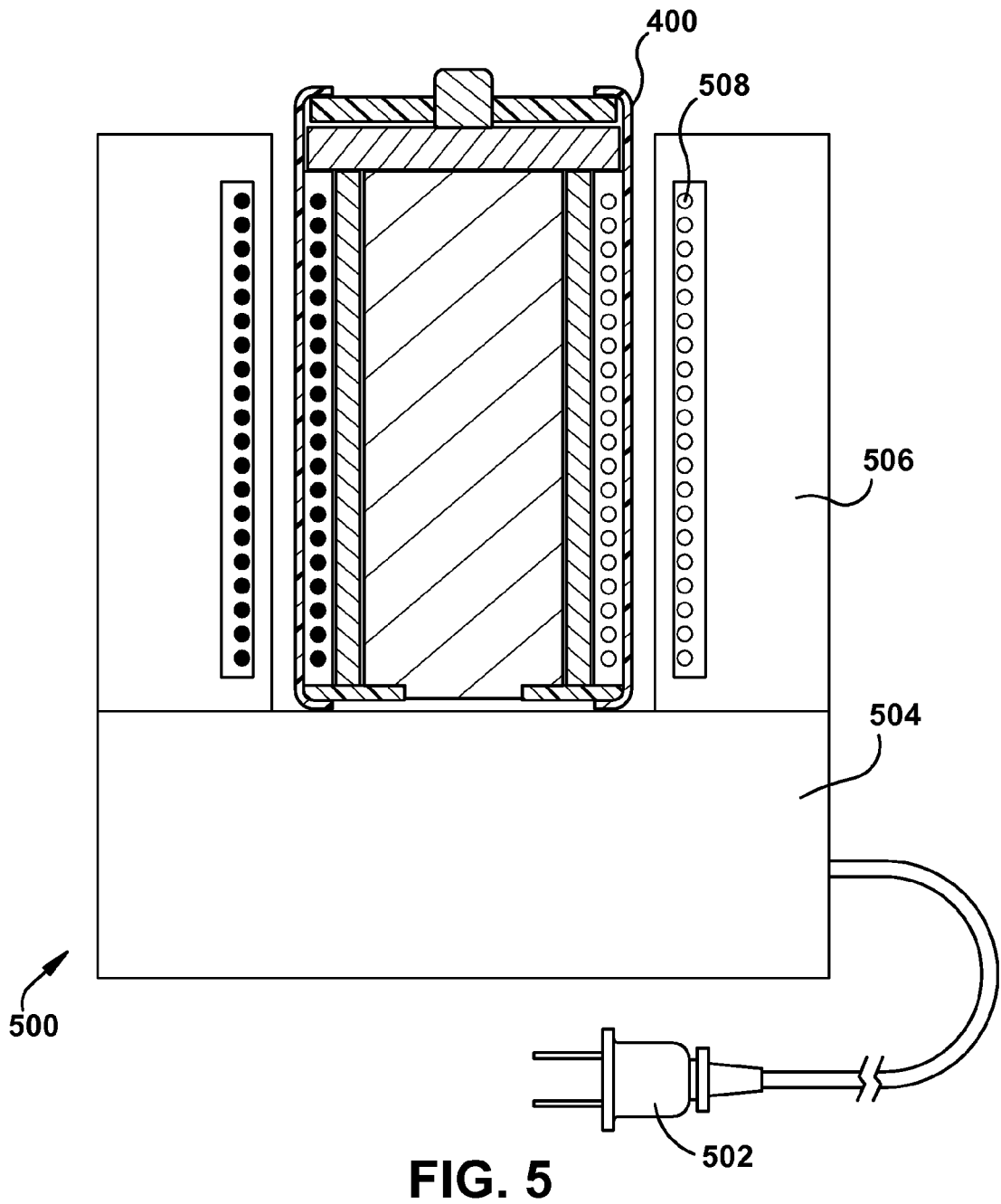
FIG. 5 is a diagram of another inductive system 500 according to an embodiment of the invention.

FIG. 5 is a diagram illustrating an inductive battery system 500 in accordance with an embodiment of the invention. The system 500 is shown with a base or pad component 504 that is operable to transfer energy to inductive enabled batteries, such as the battery 400 in order to charge and/or supply power. The system 500 is shown in this example with the inductive battery 400, however other inductive batteries and/or inductive devices operable to receive inductive power can also be configured to receive the transferred or supplied energy.

The system 500 includes a base or pad component 504 and side component(s) 506. The side component(s) include a primary coil system 508. The primary coil system 510 is connected to a power supply 502 or other suitable power source to receive power. The primary coil system 510 generates an inductive/magnetic field from the received power. In one example, the generated field is according to preconfigured characteristics and includes frequency. The generated field can be employed by the battery 400 to recharge itself. The system 500 optionally includes side components 506 that can stabilize and/or align the battery 400. In one example, the side components 506 are removable.

The base component 504 optionally includes a visual or audio interface (not shown) for providing information as to the status or operation of the base component 504. For example, the interface could emit a sound when power is being transferred or display a green indicator light.

FIG. 6 depicts a method 600 of operating an inductive battery system according to an embodiment of the invention. It is appreciated that the method 600 is illustrated in the shown order, however the method 600 can be performed in varied orders and include additional blocks or steps to perform and omit shown blocks.

External electrical power is received at block 602. The power may be received from mains power or some other suitable power source. The electrical power is converted to inductive power at block 604. A primary coil system can be employed to perform this conversion. The inductive power is received and converted into received electrical energy at block 606. A secondary coil system can be employed to perform this conversion. The received electrical energy is employed to charge an internal battery at block 608. Circuitry, such as charge circuitry, can be employed to charge the internal battery at a suitable rate.

FIG. 7 is a method 700 of designing an inductive battery according to an embodiment of the invention. The method 700 can be employed to design and/or fabricate an inductive battery having desired operating characteristics.

The method 700 begins at block 702 wherein available space is determined. The available space is a volume and/or shape limitation for the inductive battery. For example, the available space may be equal to the volume of a AAA sized battery.

A power transfer rate is selected at block 704. The power transfer rate is a rate of which power is to be transferred from a primary coil system to the battery. A battery capacity is selected at block 706. The battery capacity is the energy storage capacity of the inductive battery. A portion of the available space is allocated to a secondary coil system according to the selected power transfer rate at block 708. A portion of the available space is allocated to an internal battery according to the selected battery capacity at block 710.

The various blocks of method 700 can be performed out of the shown order and interactively and/or iteratively. For example, the determined allocated coil system space may be insufficient and require increasing available space.

FIGS. 8-11 illustrate an example of a conductive rod in accordance with an embodiment of the invention. The rod comprises a ferrite material 806 and an inner core 802 that is comprised of an electrically conductive material 802, such as nickel plated steel. An insulator 804 is also placed between the ferrite material and the conductive material to serve as an electrical barrier.

Figure 8:
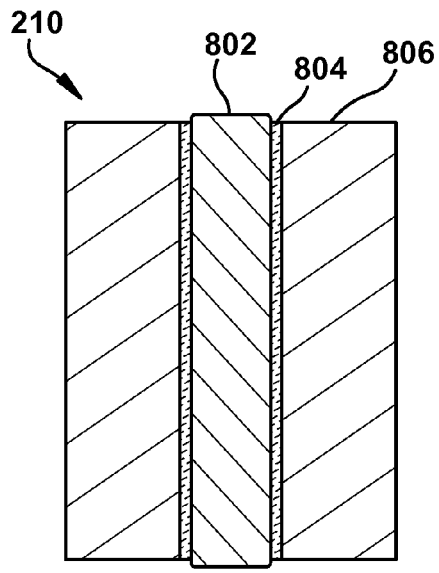
FIG. 8 is a diagram of rod 210 according to an embodiment of the invention.
Figure 9:
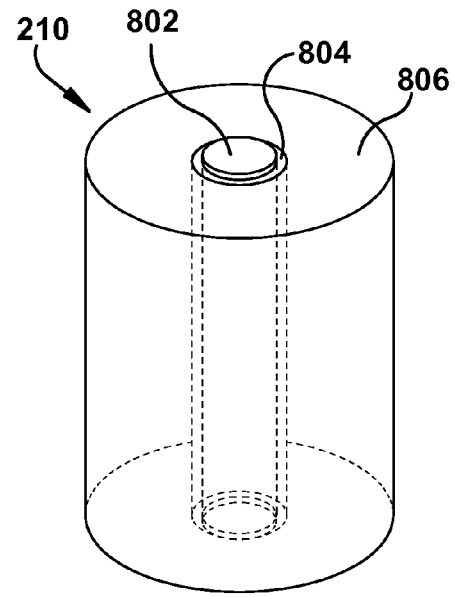
FIG. 9 is a diagram of rod 210 according to an embodiment of the invention.
Figure 10:
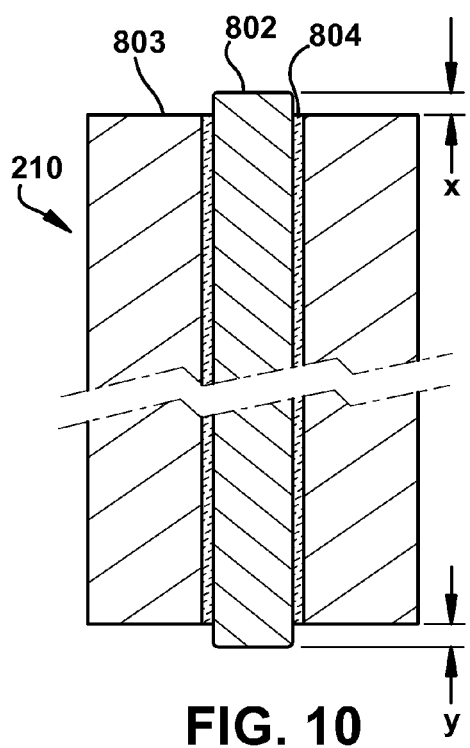
FIG. 10 is a diagram of rod 210 according to an embodiment of the invention.
Figure 11:
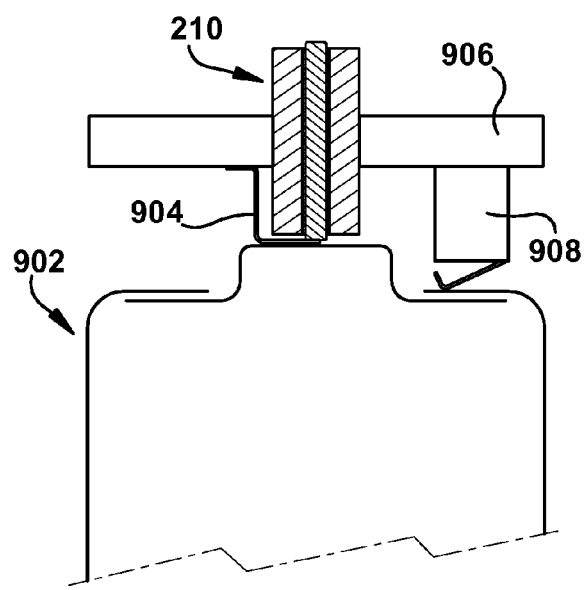
FIG. 11 is a diagram of rod 210 according to an embodiment of the invention.

These three materials 802, 804, 806 are coaxially aligned as shown in FIG. 8. Details on the contacting of the conductive rod, the battery and the printed circuit board are shown in FIG. 11. Note 802 protrudes above the edge of 804 and 806 on both sides. This allows for electrical contacting of the battery without interfering with the ferrite material. FIG. 10 depicts x and y variations that can be present and their approximate locations. The amount of variation for each of x and y can vary through a range of suitable values. 904 also shows detail on how the electrical connection with the circuit board 906 and positive end of the battery is made with the conductive rod 210. FIG. 11 includes a printed circuit board 906 and a connection mechanisms 908 to connect to a negative contact of the battery. It is appreciated that FIGS. 8-11 are illustrative examples and that the invention contemplates other suitable compositions.

The following paragraphs are considered part of the detailed description.

1. An inductive battery system 100, comprising:
a primary coil system 102 that provides inductive power 106; and
an inductive battery 200, 400 including:
a secondary coil system 108 that receives the inductive power 106;
charge circuitry 110 coupled to the secondary coil system 108;
output circuitry 112;
an internal battery 114 coupled to the charge circuitry 110 and the output circuitry 112, wherein less than 10% of available space is allocated to the secondary coil system.

2. The system of claim 1, further comprising a case 202 that encloses the charge circuitry 110, the output circuitry 112, and the internal battery 114.

3. The system of claim 2, wherein the secondary coil system 108 is within the case 202.

4. The system of claim 2, wherein the secondary coil system 108 is within a label applied to an exterior surface of the case 202.

5. The system of claim 1, wherein the secondary coil system 108 converts the inductive power 106 into electrical power 116 having selected characteristics including a selected current and a selected voltage.

6. The system of claim 1, wherein the charge circuitry receives electrical power 116 from the secondary coil system 108 and provides charging power 118 to the internal battery 114.

7. The system of claim 6, wherein the charging power 118 is a constant current value.

8. The system of claim 6, wherein the charging power 118 is provided as a constant current until a voltage of the internal battery 114 reaches a first value and then the charging power 118 is provided as a constant voltage until the internal battery 114 is fully charged.

9. The system of claim 1, wherein the internal battery 114 supplies output power 120.

10. The system of claim 9, wherein the output circuitry 112 receives the output power 120 and provides external power 124.

11. The system of claim 10, wherein the output circuitry 112 modifies the external power 124 to have varied characteristics from the output power 120.

12. An inductive battery, comprising:
a casing 202, 402;
a secondary coil system 108 that receives inductive power 106 and provides electrical power 116;
charge circuitry 110 coupled to the secondary coil system 108 that receives the electrical power 116 and provides charging power 118;
output circuitry 112 that provides external power 124; and
an internal battery 114 located within the casing 202 and coupled to the charge circuitry 110 and the output circuitry 112 that receives the charging power 118 and provides output power 120 to the output circuitry 112.

13. The system of claim 12, further comprising a positive contact 212, 412 positioned at a first end of the casing 202, 402 and a negative contact 214, 414 positioned at a second end of the casing 202, 402.

14. The system of claim 13, wherein the positive contact 212 and the negative contact 214 are connected to the output circuitry 112.

15. The system of claim 14, wherein the positive contact 212 and the negative contact are connected to the charge circuitry 110.

The above paragraphs are considered part of the detailed description.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. An inductive battery system, comprising:
a casing;
a secondary coil system that receives inductive power and provides electrical power;
charge circuitry coupled to the secondary coil system that receives the electrical power and provides charging power;
output circuitry that provides external power;
an internal battery located within the casing and coupled to the charge circuitry and the output circuitry that receives the charging power and provides output power to the output circuitry; and
a conductive rod connected to a positive contact and a positive battery contact of the internal battery, wherein the conductive rod provides a conductive path from the positive contact to the positive battery contact of the internal battery and comprises a ferrite material that facilitates coupling of the secondary coil system with a magnetic field from a primary coil system.

2. The system of claim 1, wherein the conductive rod comprises multiple materials.

3. The system of claim 2, wherein the multiple materials comprise the ferrite material and a conductive material.

4. The system of claim 3, wherein the conductive rod further comprises an insulator layer between the multiple materials.

5. The system of claim 1, wherein the positive contact and a negative contact are connected to the output circuitry.

6. The system of claim 1, wherein the positive contact and a negative contact are connected to the charge circuitry.

7. The system of claim 1, further comprising a coil cavity and a battery cavity.

8. The system of claim 7, wherein the secondary coil system comprises secondary coils within the coil cavity.

9. The system of claim 1, wherein the secondary coil system is located within a label attached to an outer surface of the casing.

10. The system of claim 1, further comprising a pad component.

11. The system of claim 10, wherein the pad component comprises a primary coil system.

12. The system of claim 10, wherein the pad component comprises a conductive rod.

13. The system of claim 10, further comprising at least one side component situated on the pad component or proximate to the pad component to stabilize and align the battery.

14. The system of claim 13, wherein the at least one side component is removable.

15. The system of claim 1, wherein the secondary coil system is located in a coil cavity between the internal battery and the positive contact.

16. An inductive battery system, comprising:
a casing;
a secondary coil system that receives inductive power and provides electrical power;
charge circuitry coupled to the secondary coil system that receives the electrical power and provides charging power, wherein the secondary coil system comprises coils located within a label attached to an outer surface of the casing;
output circuitry that provides external power; and
an internal battery located within the casing and coupled to the charge circuitry and the output circuitry that receives the charging power and provides output power to the output circuitry.

17. The system of claim 16 further comprising a conductive rod connected to a positive contact and a positive battery contact of the internal battery.

18. The system of claim 17, wherein the conductive rod comprises a ferrite material and a conductive material, wherein the ferrite material facilitates coupling of the secondary coil system with a magnetic field from a primary coil system.

19. The system of claim 18, wherein the conductive rod further comprises an insulator layer between the ferrite material and the conductive material.

* * * * *